United States Patent [19]

Naito et al.

[11] Patent Number: 5,649,747
[45] Date of Patent: Jul. 22, 1997

[54] ANTI-SKID CONTROL DEVICE IN WHICH REAR BRAKE PRESSURE IS REDUCED WHEN FRONT BRAKE PRESSURE IS DECREASED

[75] Inventors: Takeshi Naito; Akitaka Nishio, both of Aichi, Japan

[73] Assignee: Aisin Seiki Kabushiki Kaisha, Kariya, Japan

[21] Appl. No.: 548,830

[22] Filed: Oct. 26, 1995

[30] Foreign Application Priority Data

Oct. 31, 1994 [JP] Japan .................................. 6-266668

[51] Int. Cl.$^6$ .................................. B60T 8/26; B60T 8/48
[52] U.S. Cl. .................................. 303/113.5; 303/116.1
[58] Field of Search .................................. 303/113.5, 186, 303/116.1, 960, 901

[56] References Cited

U.S. PATENT DOCUMENTS

| | | | |
|---|---|---|---|
| 4,637,664 | 1/1987 | Arikawa | 303/113.5 |
| 4,735,279 | 4/1988 | Sato | 303/113.5 |
| 4,765,433 | 8/1988 | Fujii et al. | 303/113.5 |
| 5,219,210 | 6/1993 | Maehara | 303/113.5 |
| 5,441,336 | 8/1995 | Takeuchi | 303/900 |
| 5,445,445 | 8/1995 | Yukio | 303/113.5 |

FOREIGN PATENT DOCUMENTS

| | | | |
|---|---|---|---|
| 6-1225 | 1/1994 | Japan | 303/113.5 |
| 6-171487 | 6/1994 | Japan . | |
| 2118651 | 11/1983 | United Kingdom | 303/186 |

*Primary Examiner*—Matthew C. Graham
*Attorney, Agent, or Firm*—Burns, Doane, Swecker & Mathis, LLP

[57] ABSTRACT

An anti-skid control device includes a front wheel brake fluid pressure control unit for determining whether the brake fluid pressure in the front wheel brake should be increased or decreased according to the rotational condition of the front wheel which is braked by the front wheel brake, and for activating a first electromagnetic valve and a hydraulic pressure pump to decrease or increase the brake fluid pressure in the front wheel brake according to a determination. A rear wheel brake fluid pressure control unit determines whether the brake fluid pressure in the rear wheel brake should be increased or decreased according to the rotational condition of the rear wheel which is braked by the rear wheel brake, and activates the second electromagnetic valve and the hydraulic pressure pump driven to decrease or increase the brake fluid pressure in the rear wheel brake according to a determination. A forcible pressure decreasing unit is provided for forcing the rear wheel brake fluid pressure control unit to decrease the brake fluid pressure in the rear wheel brake when the front wheel brake fluid pressure control unit decreases the brake fluid pressure in the front wheel brake.

8 Claims, 4 Drawing Sheets

ANTI-SKID CONTROL DEVICE IN WHICH REAR BRAKE PRESSURE IS REDUCED WHEN FRONT BRAKE PRESSURE IS DECREASED

BACKGROUND OF THE INVENTION

1. Field of the Invention

This invention relates to an anti-skid control device which, in a wheel braking operation, controls wheel braking forces so as to prevent the locking of the wheels.

2. Description of the Related Art

In general, with a recent anti-skid control device, the brake fluid pressures in four wheel brakes—a front right wheel brake, a front left wheel brake, a rear right wheel brake, and a rear left wheel brake—are decreased or increased independently of one another, and three brake control systems, namely, a front left wheel brake control system, a front right wheel brake control system, and a rear right and left wheel brake control system are established; or four brake control systems, namely, a front left wheel brake control system, a front right wheel brake control system, a rear left wheel brake control system, and a rear right wheel brake control system are established.

A variety of control devices have been proposed in the art which control (increases and decreases) the brake fluid pressures in four wheel brakes independently of one another. Among those control systems, the system disclosed by Japanese Patent Unexamined Publication No. Hei 6-171487 is small in the number of components and low in manufacturing cost.

The control device is designed as follows:

In a first main path which hydraulically connects the front left wheel brake and the rear right wheel brake to a first pressure chamber which is one of the two pressure chambers in a master cylinder, there are arranged a normally open first electromagnetic valve which selectively isolates only the front left wheel brake from the first pressure chamber, and a normally open second electromagnetic valve which selectively isolates only the rear right wheel brake from the first pressure chamber;

in a second main path which hydraulically connects the front right wheel brake and the rear left wheel brake to a second pressure chamber which is the other of the two pressure chamber in the master cylinder, there are arranged a normally open third electromagnetic valve which selectively isolates only the front right wheel brake from the second pressure chamber, and a normally open fourth electromagnetic valve which selectively isolates only the rear left wheel brake from the second pressure chamber;

a first circulating path is provided which bypasses the first electromagnetic valve, to circulate the brake fluid in the front left wheel brake to the first main path between the first pressure chamber and the first and second electromagnetic valves, and which bypasses the second electromagnetic valve, to circulate the brake fluid in the rear right wheel brake to the first main path between the first pressure chamber and the first and second electromagnetic valves;

a second circulating path is provided which bypasses the third electro-magnetic valve, to circulate the brake fluid in the front right wheel brake to the second main path between the second pressure chamber and the third and fourth electromagnetic valves, and which bypasses the fourth electromagnetic valve, to circulate the brake fluid in the rear left wheel brake to the second path between the second pressure chamber and the third and fourth electromagnetic valves;

in the first circulating path, a first hydraulic pump is provided which sends brake fluid from the front left wheel brake and the rear right wheel brake to the first main path between the first pressure chamber and the first and second electromagnetic valves;

in the second circulating path, a second hydraulic pump is provided which sends brake fluid from the front right wheel brake and the rear left wheel brake to the second main path between the second pressure chamber and the third and fourth electromagnetic valves;

in the first circulating path between the front left wheel brake and the first hydraulic pressure pump, a first orifice is provided which increases and decreases the brake fluid pressure in the front left wheel brake in response to the activation and deactivation of the first electromagnetic valve with the master cylinder and the first hydraulic pressure pump in operation;

in the first circulating path between the rear right wheel brake and the first hydraulic pressure pump, a second orifice is provided which increases and decreases the brake fluid pressure in the rear right wheel brake in response to the activation and deactivation of the second electromagnetic valve with the master cylinder and the first hydraulic pressure pump in operation;

in the second circulating path between the front right wheel brakes and the second hydraulic pressure pump, a third orifice is provided which increases and decreases the brake fluid pressure in the front right wheel brake in response to the activation and deactivation of the third electromagnetic valve with the master cylinder and the second hydraulic pressure pump in operation; and in the second circulating path between the rear left wheel brake and the second hydraulic pressure pump, a fourth orifice is provided which increases and decreases the brake fluid pressure in the rear left wheel brake in response to the activation and deactivation of the fourth electromagnetic valve with the master cylinder and the second hydraulic pressure pump in operation.

However, the above-described control device including three or four brake control systems suffers from the following problem: With the control device, one hydraulic pressure pump decreases the brake fluid pressures in the front and rear wheel brakes. Hence, when the brake fluid pressure in the rear wheel brake which consumes a relatively small quantity of brake fluid is increased; that is, when it is high, the pressure decreasing capacity of the front wheel brake which consumes a relatively large quantity of brake fluid is lowered. As a result, the restoration in speed of the front wheel is delayed, so that the front wheel is liable to be locked.

SUMMARY OF THE INVENTION

An object of the invention is to eliminate the above-described difficulty accompanying a conventional control device.

The foregoing object of the invention has been achieved by the provision of an anti-skid control device, comprising: a master cylinder having a pressure chamber therein; a main path which hydraulically connects a front wheel brake and a rear wheel brake to said pressure chamber in said master cylinder; a normally open first electromagnetic valve for selectively isolating only said front wheel brake from said pressure chamber; a normally open second electromagnetic valve for selectively isolating only said rear wheel brake from said pressure chamber; a circulating path which bypasses said first electromagnetic valve to circulate a brake fluid in said front wheel brake to said main path between said pressure chamber and said first and second electromagnetic valves, and which bypasses said second electromagnetic valve to circulate a brake fluid in said rear wheel brake to said main path between said pressure chamber and said first and second electromagnetic valves; a hydraulic pressure pump provided in said circulating path, for sending a brake fluid under pressure from said front and rear wheel brakes to said main path between said pressure chamber and said first and second electromagnetic valves; a first orifice provided in said circulating path between said front wheel brake and said hydraulic pressure pump, for increasing and decreasing the brake fluid pressure in said front wheel brake in response to the activation and deactivation of said first electromagnetic valve with said master cylinder and said hydraulic pressure pump in operation; a second orifice provided in said circulating path between said rear wheel brake and said hydraulic pressure pump, for increasing and decreasing the brake fluid pressure in said rear wheel brake in response to the activation and deactivation of said second electromagnetic valve with said master cylinder and said hydraulic pressure pump in operation; front wheel brake fluid pressure control means for determining whether the brake fluid pressure in said front wheel brake should be increased or decreased according to a rotational condition of a front wheel which is braked by said front wheel brake, and for making said first electromagnetic valve and said hydraulic pressure pump driven to decrease or increase the brake fluid pressure in said front wheel brake according to a determination; rear wheel brake fluid pressure control means for determining whether the brake fluid pressure in said rear wheel brake should be increased or decreased according to a rotational condition of a rear wheel which is braked by said rear wheel brake, and for making said second electromagnetic valve and said hydraulic pressure pump driven to decrease or increase the brake fluid pressure in said rear wheel brake according to a determination; and forcible pressure decreasing means for forcing said rear wheel brake fluid pressure control means to decrease the brake fluid pressure in said rear wheel brake when said front wheel brake fluid pressure control means decreases the brake fluid pressure in said front wheel brake.

Also, the anti-skid control device may further forcible pressure decrease releasing means for suspending the forcible decreasing of the brake fluid pressure in said rear wheel brake when the brake fluid pressure in said rear wheel brake is forcibly decreased by said forcible pressure decreasing means longer than a predetermined period of time.

With the anti-skid control device of the invention, when the brake fluid pressure in the front wheel brake is decreased while the brake fluid pressure in the rear wheel brake is being increased, the brake fluid pressure in the rear wheel brake is forcibly decreased. As a result, the quantity of brake fluid which flows from the rear wheel brake through the second orifice to the circulating path is decreased, which increases the pressure decreasing capacity of the front wheel brake, and accelerates the restoration in speed of the front wheel, and eliminates the difficulty that the front wheel tends to be locked.

The nature, utility and principle of the invention will be more clearly understood from the following detailed description and the appended claim when read in conjunction with the accompanying drawings.

DETAILED DESCRIPTION OF THE PREFERRED EMBODIMENTS

Figure 1:
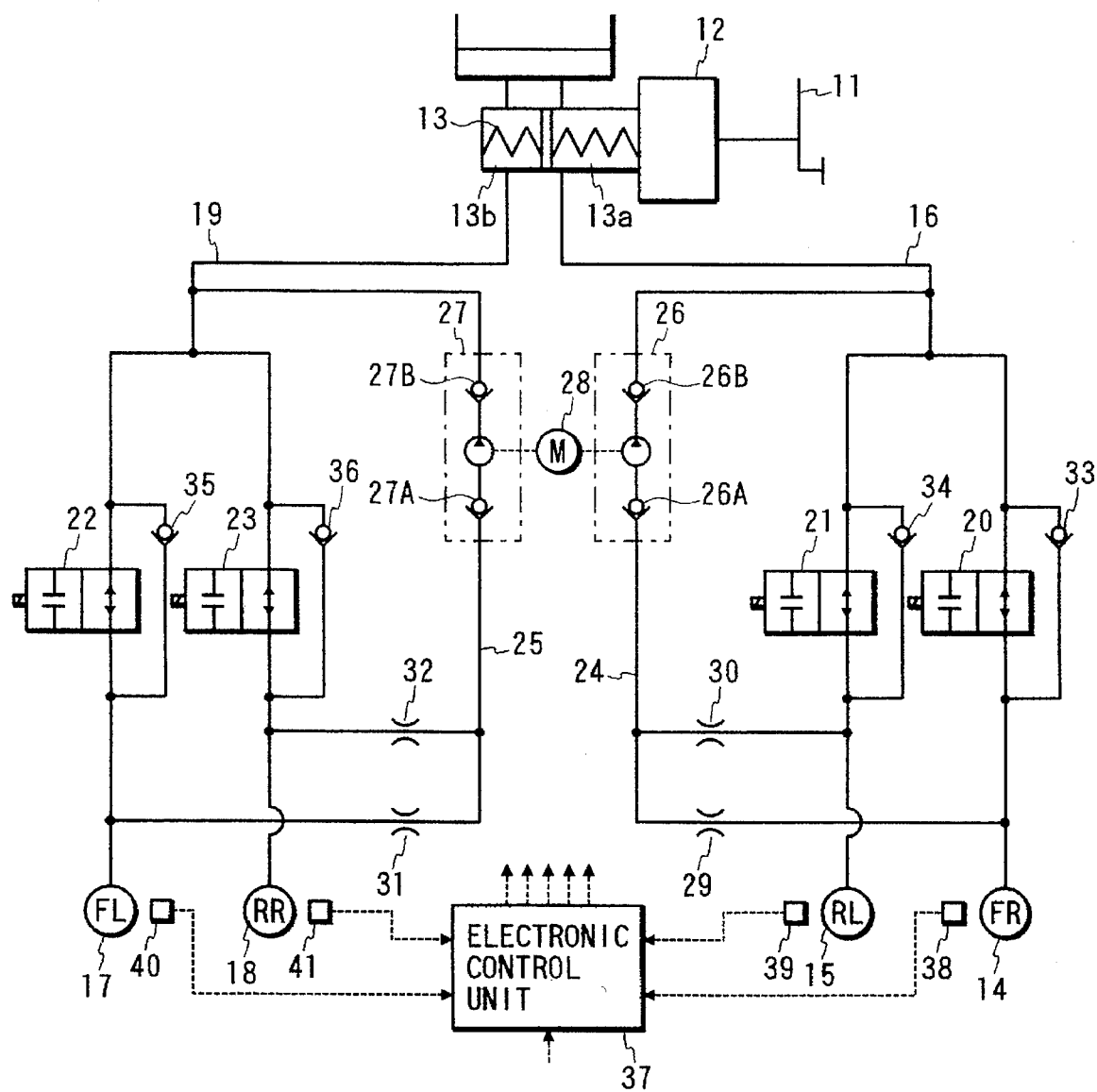
FIG. 1 is a diagram showing the arrangement of an anti-skid control device according to an embodiment of the invention.

A description will be given of an anti-skid control device in accordance with an embodiment of the invention with reference to the accompanying drawings.

First, the arrangement of the anti-skid control device will be described with reference to FIG. 1.

A brake operating force applied through a brake pedal 11 is transmitted through a negative pressure type booster 12 to a tandem master cylinder 13. A first main path 16 hydraulically connects a front right wheel brake 14 and a rear left wheel brake 15 to one 13a (hereinafter referred to as "a first pressure chamber 13a") of two pressure chambers in the master cylinder 13, while a second main path 19 hydraulically connects a front left wheel brake 17 and a rear right wheel brake 18 to the other pressure chamber 13b (hereinafter referred to as "a second pressure chamber 13b") in the master cylinder 13.

The first main path 16 includes a normally open first electromagnetic valve 20 for isolating only the front right wheel brake 14 from the first pressure chamber 13a in the master cylinder 13, and a normally open second electromagnetic valve for isolating only the rear left wheel brake 15 from the first pressure chamber 13a in the master cylinder 13. Likewise, the second main path 16 includes a normally open third electromagnetic valve 22 for isolating only the front left wheel brake 17 from the second pressure chamber 13b in the master cylinder 13, and a normally open fourth electromagnetic valve 23 for isolating only the rear right wheel brake 18 from the second pressure chamber 13b in the master cylinder 13.

In order to allow the brake fluid in the front right wheel brake 14 and the rear left wheel brake 15 to circulate to the main path 16 between the master cylinder 16 and the electro-magnetic valves 20 and 21 while bypassing the electromagnetic valves 20 and 21, a first circulating path 24 is connected to the first main path 16. Likewise, in order to allow the brake fluid in the front left wheel brake 17 and the rear right wheel brake 18 to circulate to the main path 19 between the master cylinder 16 and the electromagnetic valves 22 and 23 while bypassing the electromagnetic valves 22 and 23, a second circulating path 25 is connected to the second main path 19.

The first circulating path 24 has a first hydraulic pressure pump 26 adapted to supply the brake fluid from the side of the front right wheel brake 14 and the rear left wheel brake 15 to the side of the master cylinder 13. Similarly, the second circulating path 25 has a second hydraulic pressure pump 27 adapted to supply the brake fluid from the side of the front left wheel 17 and the rear right wheel brake 18 to the side of the master cylinder 13. Those pumps 26 and 27 are driven by one electric motor 28. In FIG. 1, reference character 26A designates a suction valve of the first hydraulic pressure pump 26; 26B, a discharge valve of the latter 26; 27A, a suction valve of the second hydraulic pressure pump 27; and 27B, a discharge valve of the latter 27.

In the first circulating path 24, a first orifice 29 is connected between the front right wheel brake 14 and the suction valve 26A. The first orifice 29 is adapted to increase or decrease the brake fluid pressure in the front right wheel brake 14 in response to the energization or deenergization of the first electromagnetic valve 20 with the master cylinder 13 and the first hydraulic pressure pump 26 in operation. In addition, a second orifice 30 is connected between the rear left wheel brake 15 and the suction valve 26A. The second orifice 30 is adapted to increase or decrease the brake fluid pressure in the rear left wheel brake 15 in response to the energization or deenergization of the second electromagnetic valve 21 with the master cylinder 13 and the first fluid pressure pump 26 in operation.

Similarly, in the second circulating path 25, a third orifice 31 is connected between the front left wheel brake 17 and the suction valve 27A. The third orifice 31 is adapted to increase or decrease the brake fluid pressure in the front left wheel brake 17 in response to the energization or deenergization of the third electromagnetic valve 22 with the master cylinder 13 and the second hydraulic pressure pump 27 in operation. In addition, a fourth orifice 32 is connected between the rear right wheel brake 18 and the suction valve 27A. The fourth orifice 32 is adapted to increase or decrease the brake fluid pressure in the rear right wheel brake 18 in response to the energization or deenergization of the fourth electromagnetic valve 23 with the master cylinder 13 and the second fluid pressure pump 27 in operation.

In the first main path 16, the electromagnetic valves 20 and 21 are shunted by check valves 33 and 34, respectively. The check valves 33 and 34 function as follows: when the fluid pressure in the first pressure chamber 13a in the master cylinder 13 becomes lower than those of the front right wheel brake 14 and the rear left wheel brake 15 for instance when the master cylinder 13 is released, the check valves 33 and 34 operate to decrease the brake fluid pressures in those brakes 14 and 15 to the fluid pressure in the first pressure chamber 13a in the master cylinder 13. Similarly, in the second main path 19, the electromagnetic valves 22 and 23 are shunted by check valves 35 and 36, respectively. The check valves 35 and 36 function as follows: when the fluid pressure in the second pressure chamber 13b of the master cylinder 13 becomes lower than those of the front left wheel brake 17 and the rear right wheel brake 18 for instance when the master cylinder 13 is released, the check valves 35 and 36 operate to decrease the brake fluid pressures in those brakes 17 and 18 15 to the fluid pressure in the second pressure chamber 13b of the master cylinder 13.

The anti-skid control device thus organized operates as follows:

In FIG. 1, when the brake pedal 11 is depressed, the master cylinder 13 is operated, so that the brake fluid pressure is applied from the first pressure chamber 13a in the master cylinder 13 through the first main path 16 and the first electromagnetic valve 20 to the front right wheel brake 17 and through the first main path 16 and the second electromagnetic valve 21 to the rear left wheel brake 15; while the brake fluid pressure is applied from the second pressure chamber 13b in the master cylinder 13 through the second main path 19 and the third electromagnetic valve 22 to the front left wheel brake 17 and through the second main path 19 and the fourth electromagnetic valve 23 to the rear right wheel brake 18. As a result, braking forces are applied to the front right wheel FR, the rear left wheel RL, the front left wheel FL, and the rear right wheel RR according to the brake fluid pressures; that is, the vehicle is braked.

In the vehicle braking operation, the brake fluid pressures in the front right wheel brake 14, the rear left wheel brake 15, the left wheel brake wheel 17, and the rear right brake wheel 18 can be increased or decreased by controlling (energizing or deenergizing) the electromagnetic valves 20 to 23 after the operation of the hydraulic pressure pumps 26 and 27 with the electric motor 28. When driven, the hydraulic pressure pump 26 moves brake fluid from its suction side to its discharge side under pressure, so that the brake fluid in the front right wheel brake 14 flows through the orifice 29 to the suction side of the hydraulic pressure pump 26, while the brake fluid in the rear left wheel brake 15 flows through the orifice 30 to the suction side of the hydraulic pressure pump 26. The brake fluids which have flowed to the suction side of the hydraulic pressure pump 26 from the front right wheel brake 14 and the rear left wheel brake 15, are returned to the main path 16 between the master cylinder 13 and the electromagnetic valves 20 and 21, thus flowing through those valves 20 and 21 into the wheel brakes 14 and 15. The orifices 29 and 30 are so designed in size that the quantity of brake fluid which flows through the orifices 29 and 30 from the wheel brakes 14 and 15 is smaller than the quantity of brake fluid which flows through the electromagnetic valves 20 and 21 into the wheel brakes 14 and 15. Hence, the brake pressure in the wheel brake 14 is decreased by closing the electromagnetic valve 20 with the hydraulic pressure pump 26 operated, and the brake pressure in the wheel brake 15 is decreased by closing the electromagnetic valve 21 with the hydraulic pressure pump 26 operated. And, the brake pressure in the wheel brake 14 is increased by opening the electromagnetic valve 20 with the hydraulic pressure pump 26 operated, and the brake pressure in the wheel brake 15 is increased by opening the electromagnetic valve 21 with the pump 26 operated. Moreover, the brake fluid pressures in the wheel brakes 14 and 15 can be each gradually increased by the duty-cycle operation of the electro-magnetic valves 20 and 21.

Similarly, the brake pressures in the wheel brakes 17 and 18 can be individually decreased, increased and gradually increased by the activation, deactivation, and duty-cycle operation of the electromagnetic valves 22 and 23 with the hydraulic pressure pump 27 operated.

In general, the quantity of brake fluid consumed by the front right wheel brake 14 and the front left wheel brake 17 is larger than that consumed by the rear left wheel brake 15 and the rear right wheel brake 18. When, in the case where the brake fluid pressure in the front right wheel brake 14 is decreased, the brake fluid pressure in the rear left wheel brake 15 is increased, then the quantity of brake fluid which flows from the rear left wheel brake 15 to the suction side of the hydraulic pressure pump 26 is increased, while the quantity of brake fluid which flows from the front right wheel brake 14 to the suction side of the pump 26 is decreased. As a result, the front right wheel FR tends to be locked.

Similarly, when, in the case where the brake fluid pressure in the front left wheel brake 17 is decreased, the brake fluid pressure in the rear right wheel brake 18 is increased, then the quantity of brake fluid which flows from the rear right wheel brake 18 to the suction side of the hydraulic pressure pump 27 is increased, while the quantity of brake fluid which flows from the front left wheel brake 17 to the suction side of the pump 27 is decreased. As a result, the front left wheel FL tends to be locked.

Hence, in the case where the brake fluid pressure in the front right wheel brake 14 is decreased, it is preferable that the brake fluid pressure in the rear left wheel brake 15 is also decreased, to thereby eliminate the difficulty that the front right wheel FR tends to be locked. Similarly, in the case where the brake fluid pressure in the front left wheel 17 is decreased, it is preferable that the brake fluid pressure in the rear right wheel brake 18 is also decreased, to thereby eliminate the difficulty that the front left wheel FL tends to be locked.

For this purpose, the following means is provided according to the invention:

As shown in FIG. 1, the electromagnetic valves 20 to 23, and the motor 28 are connected to an electronic control unit 37; that is, they are controlled by the latter 37. The front right wheel FR which is braked by the front right wheel brake 14, the rear left wheel RL which is braked by the rear left wheel brake 15, the front left wheel FL which is braked by the front left wheel brake 17, and the rear right wheel RR which is braked by the rear right wheel brake 18 are provided with wheel speed sensors 38, 39 40 and 41, respectively. Those sensors 38 to 41 are connected to the electronic control unit 37.

Figure 2:
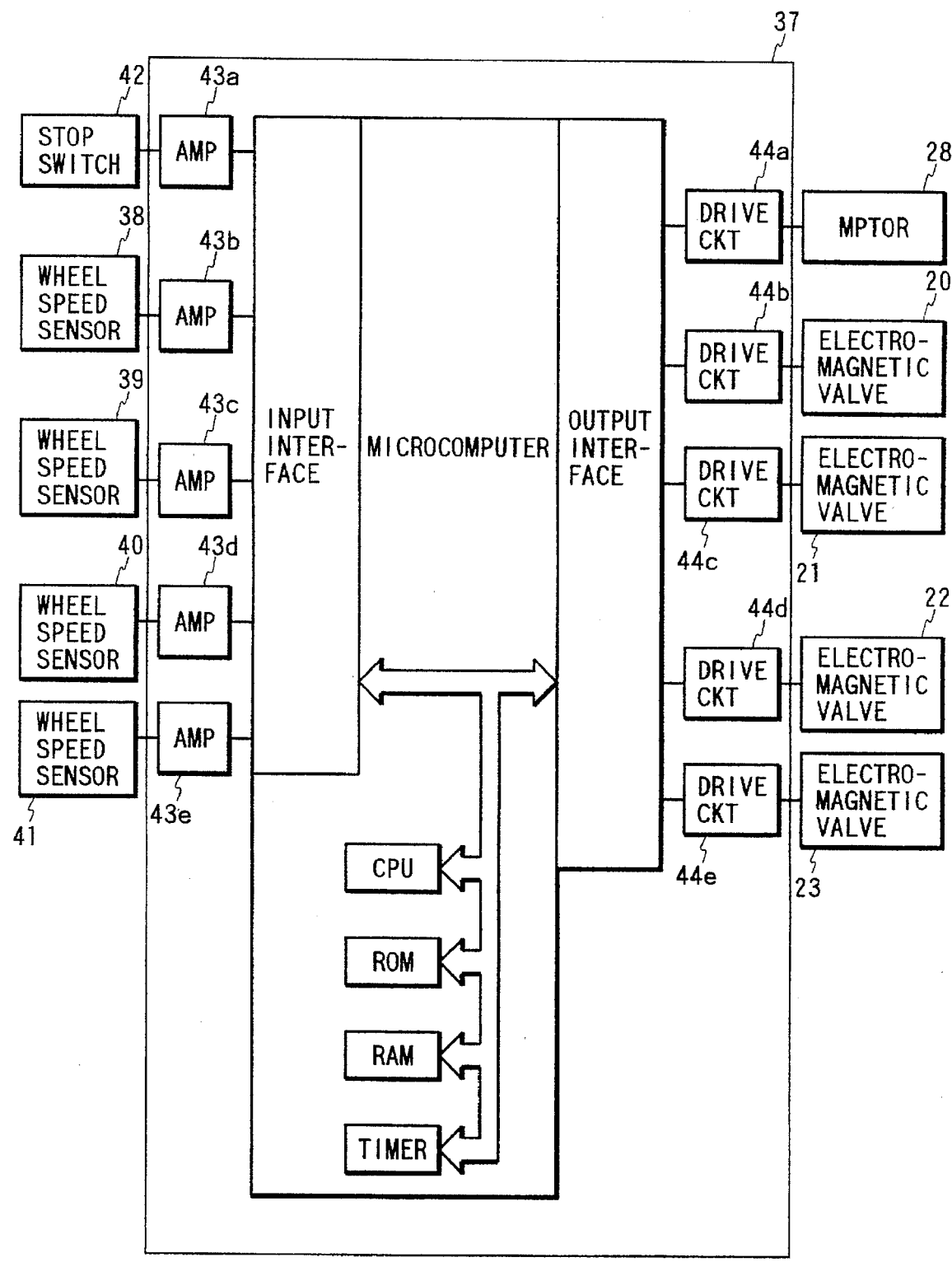
FIG. 2 is a block diagram showing the arrangement of an electronic control unit in the anti-skid control device shown in FIG. 1.

The electronic control unit 37, as shown in FIG. 2, has a microcomputer comprising, a CPU, ROM, RAM, timer, input interface and output interface which are connected to one another through bus bars. The output signals of a stop switch 42 (which is turned on when the brake pedal 11 is depressed) and of the above-described wheel speed sensors 38 to 41 are applied respectively through amplifier circuits 43a to 43e and through the input interface to the CPU. On the other hand, a control signal is applied from the output interface through a drive circuit 44 to the motor 28, and drive signals are applied through drive circuits 44b to 44e to the electromagnetic valves 20 to 23. In the microcomputer, the ROM stores a program corresponding to a flow chart of FIG. 3, the CPU executes the program while an ignition switch (not shown) is held closed, and the RAM temporarily stores variable data necessary for the execution of the program.

Figure 3:
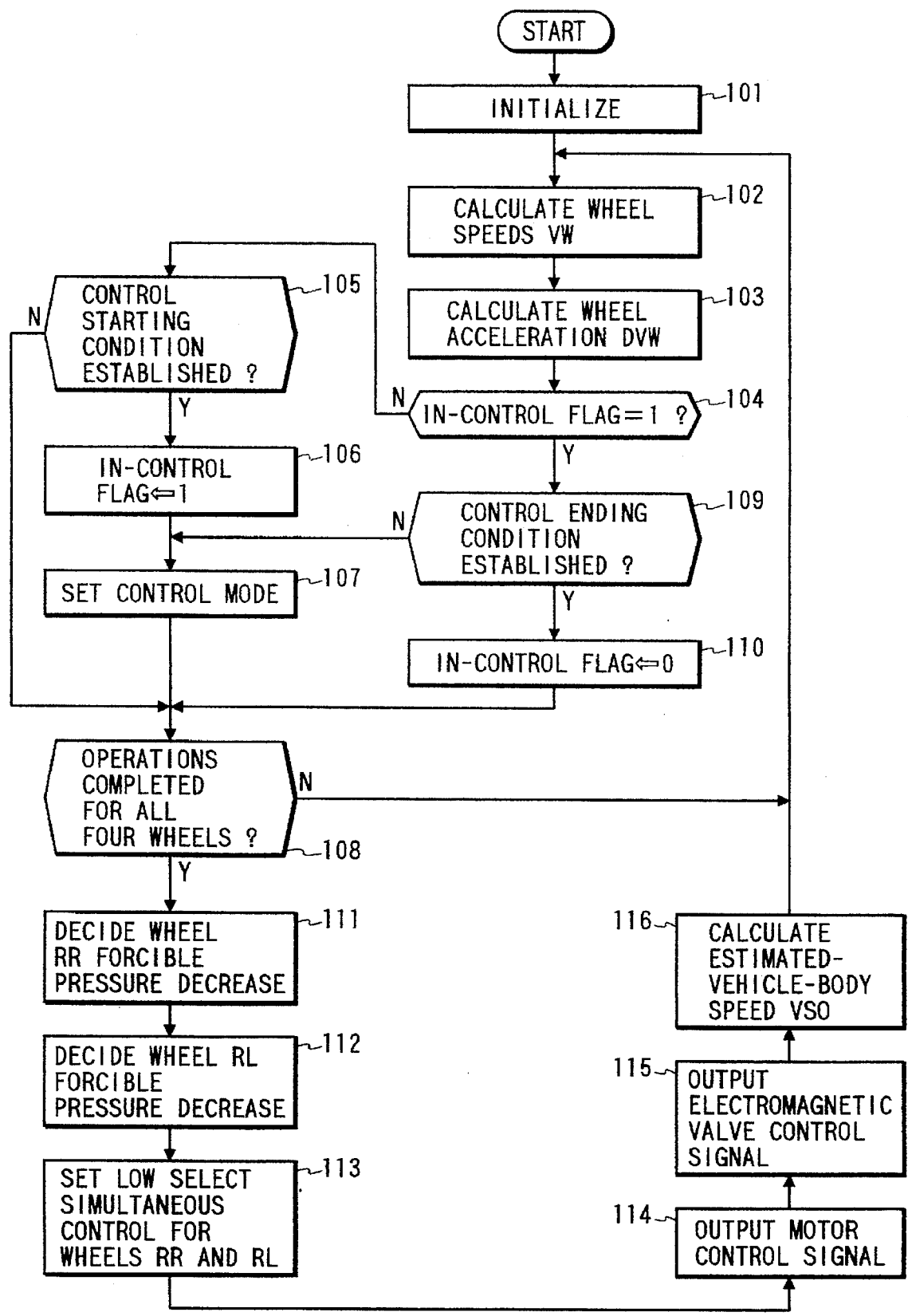
FIG. 3 is a flow chart showing the contents of an anti-skid control main routine in the control device of the invention.

In this embodiment thus constituted, when the ignition switch (not shown) is closed, the execution of the program corresponding to the flow chart of FIG. 3 is started. First, in Step 101 of FIG. 3, the microcomputer is initialized, so that a variety of arithmetic values, an estimate vehicle body speed VSO representing a vehicle speed, wheel speeds VW and wheel accelerations DVW of the four wheels (the front right wheel FR, the front left wheel FL, the rear right wheel RR, and the rear left wheel RL) are cleared. In Step 102, the wheel speeds VW of the four wheels are calculated from the output signals of the wheel speed sensors 38 to 41. In Step 103, the wheel accelerations DVW are calculated from the wheel Speeds VW.

Thereafter, control proceeds to Step 104. In Step 104, it is determined whether or not an in-control flag of each wheel is "1" (indicating that anti-skid control is being effected). When it is determined that the in-control flag is not "1", then Step 105 is effected, in which it is determined from the output signal of the stop switch, the wheel speed VW, the wheel accelerations DVW and the estimated vehicle body speed VSO whether a control starting condition has been established, or not. When it is determined that the control starting condition has not yet been established, then control proceeds to Step 108. When it is determined that the control start condition has been established, then Step 106 is effected. In Step 106, the in-control is set to "1". Thereafter, Step 107 is effected, so that the control modes of the wheels are set to a pressure decrease mode, a pressure gradual-increase mode, or a pressure increase mode according to the wheel speeds VW, the wheel accelerations DVW and the estimated vehicle body speed VSO. Then, control proceeds to Step 108. On the other hand, in the case where it is determined in Step 104 that the in-control flag is "1" (indicating that the anti-skid control is being effected), in Step 109 it is determined whether a control ending condition (an anti-skid control ending condition) has been established, or not. When it is determined that the control ending condition has not yet been established, then Step 107 is effected, so that the control modes of the wheels are set as was described above. When, on the other hand, it is determined in Step 109 that the control ending condition has been established, Step 110 is effected, so that the in-control flag is set to "0". Thereafter, control proceeds to Step 108.

The above-described operations of Steps 102 to 110 are carried out for each of the wheels. When it is determined in Step 108 that the operations are carried out for all of the four wheels, control proceeds to Step 111, so that a wheel RR forcible pressure decrease decision is carried out. Thereafter, control proceeds to Step 112 in which a wheel RL forcible pressure decrease decision is carried out. Next, after control proceeds to Step 113 in which the low select simultaneous control setting of the wheels RR and RL is carried out, in Step 114 a motor control signal outputting operation is carried out; and in Step 115, an electromagnetic valve control signal outputting operation is carried out, and in Step 116, an estimated-vehicle-body-speed VSO calculating operation is carried out. Then, Step 102 is effected again.

Figure 4:
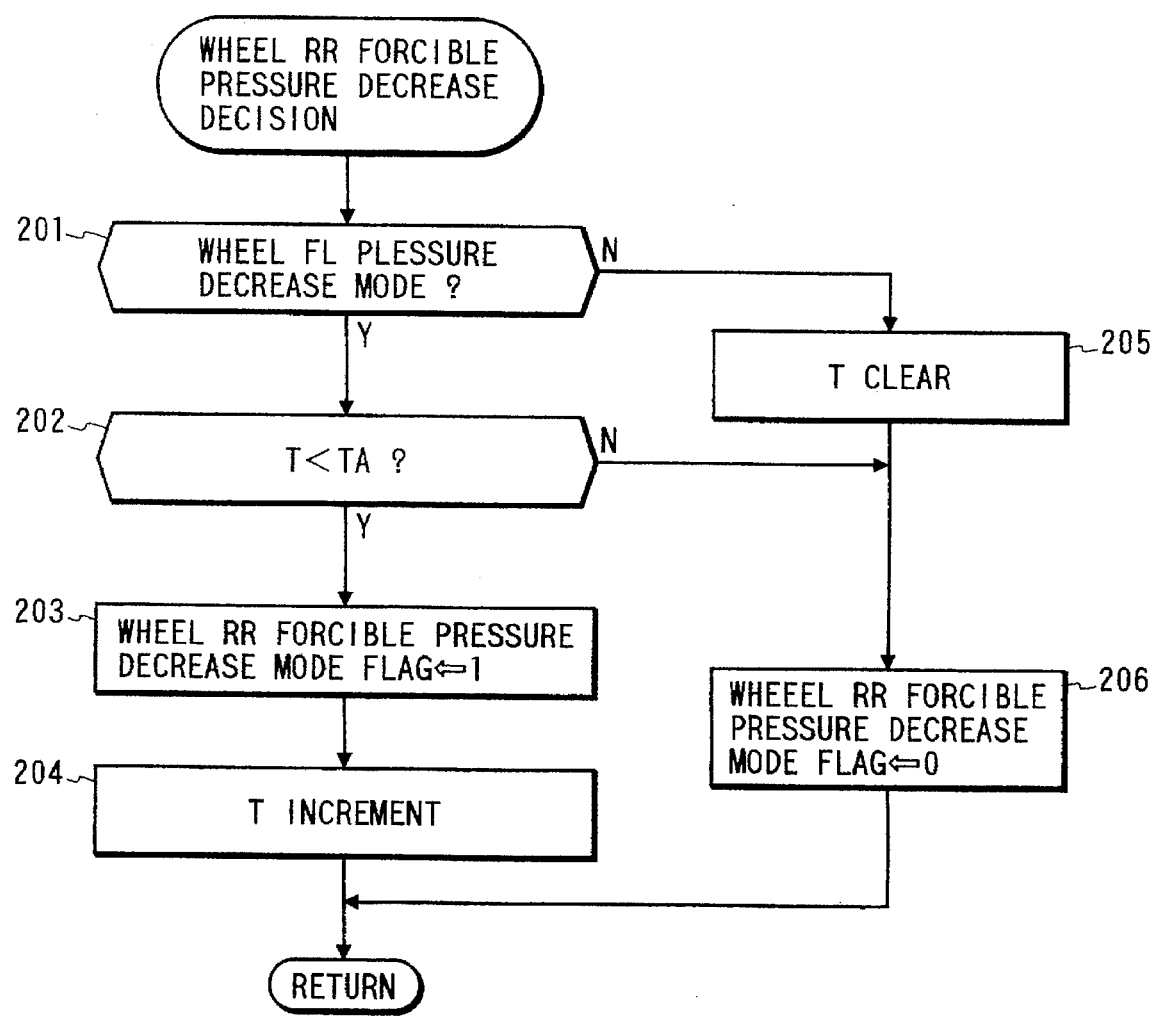
FIG. 4 is a flow chart showing the contents of a wheel RR forcible pressure decrease mode.

FIG. 4 shows the contents of the wheel RR forcible pressure decrease decision carried out in Step 111. First, in Step 201, it is determined whether or not the wheel FL is in the pressure decrease mode. When it is not in the pressure decrease mode, then Step 205 is effected, so that the content T of a forcible-pressure-decrease continuation time counter is cleared. In Step 206, a forcible-pressure-decrease mode flag is reset to "0". Under this condition, the main routine is effected again. On the other hand, in the case where the wheel FL is in the pressure decrease mode, Step 202 is effected. In Step 202, it is determined whether or not the content T of the forcible-pressure-decrease continuation time counter is smaller than a predetermined value TA (for instance 100 ms). When it is determined that the content T is smaller than the predetermined value TA, in Step 203 a wheel RR forcible-pressure-increase mode flag is set to "1", and in Step 204 the forcible-pressure-decrease continuation time counter is incremented. Under this condition, the main routine shown in FIG. 3 is effected again. In the case where in Step 202 the content T of the time counter is equal to or larger than the value TA, Step 206 is effected. In Step 206, the forcible-pressure-decrease mode flag is reset to "0". Thereafter, the operation is returned to the main routine shown in FIG. 3.

The operations carried out in Step 112 are the same as those described with reference to FIG. 4; that is, the above description made with reference to FIG. 4 may be read with the characters RR and FL changed into RL and FR, respectively.

In Step 113 (FIG. 3), whether the respective control modes set for the wheels RR and RL in Step 107 are the pressure decrease mode, the pressure gradual-increase mode or the pressure increase mode are detected. In the case where any one of the wheels RR and RL is in the pressure decrease mode, both of them are placed in the pressure decrease mode. In the case where none of the wheels RR and RL is in the pressure decrease mode, and any one of them is in the pressure gradual-increase mode, then both of the wheels RR and RL are placed in the pressure gradual-increase mode. In Step 114, in response to the fact that any one of the in-control flags of the four wheels is set to "1", the electric motor 28 is turned on; and in response to the fact that all of the in-control flags of the four wheels are set to "0", the electric motor 28 is turned off. In step 115 (FIG. 3), for the electro-magnetic valve corresponding to the wheel to be controlled (for instance, the electro-magnetic valve 20 in the case where the wheel FR is to be controlled), the control signal corresponding to the control mode which has been set in Step 107 (a continuous energization control signal to the pressure decrease mode, a continuous non-energization control signal to the pressure increase mode, and a duty energization control signal to the pressure gradual-increase mode) is outputted. However, as for the wheel RR, it should be noted that, in the case where the wheel RR forcible pressure decrease mode flag is "1", the electro-magnetic valve 23 is continuously energized irrespective of the control mode which has been set in Step 107. Similarly, as for the wheel RL, it should be noted that, in the case where the wheel RL forcible pressure decrease mode flag is "1", the electro-magnetic valve 21 is continuously energized irrespective of the control mode which has been set in Step 107.

As for the forcible pressure decrease of the wheels RR nd RL, the electronic control unit may be so designed that, in response to the fact that the wheel RR forcible pressure decrease mode flag or the wheel RL forcible pressure decrease mode flag is "1", both of the electro-magnetic valves 23 and 21 are continuously energized so that the braking forces applied to those rear wheels RR and RL be equal to each other.

As is apparent from the above description, in the anti-skid control, the electronic control unit 37 operates to control the brake fluid pressures in the wheel brakes as follows: When the brake fluid pressure in the front right wheel brake 14 is decreased, the electronic control unit 37 forcibly decreases the brake fluid pressure in the rear left wheel brake 15 or the brake fluid pressures in the two rear wheel brakes 15 and 18; and when the brake fluid pressure in the front left wheel brake 17 is decreased, the unit 37 forcibly decreases the brake fluid pressure in the rear right wheel brake 18 or the brake fluid pressures in the two rear wheel brakes 15 and 18. Hence, the quantity of brake fluid which flows from the rear left wheel brake 15 to the suction side of the hydraulic pressure pump 26 is decreased, and accordingly the front right wheel brake 14 is increased in pressure decreasing capacity, which prevents the front right wheel FR from tending to be locked; and similarly, the quantity of brake fluid which flows from the rear right wheel brake 18 to the suction side of the hydraulic pressure pump 26 is decreased, and accordingly the front left wheel brake 17 is increased in pressure decreasing capacity, which prevents the front left wheel FL from tending to be locked.

As was described above, in the anti-skid control device of the invention, the front wheel brake fluid pressure control means is provided which, from a rotational condition of the front wheel which is braked by the front wheel brake, determines whether the brake fluid pressure in the front wheel brake should be increased or decreased, and drives the first electro-magnetic valve and the hydraulic pressure pump thereby to decrease or increase the brake fluid pressure in the front wheel brake; the rear wheel brake fluid pressure control means is provided which, from a rotational condition of a rear wheel which is braked by the rear wheel brake, determines whether the brake fluid pressure in the rear wheel brake should be increased or decreased, and drives the second electro-magnetic valve and the hydraulic pressure pump thereby to decrease or increase the brake fluid pressure in the rear wheel brake; and the forcible pressure decreasing means is provided which, when the front wheel brake fluid pressure control means decreases the brake fluid pressure in the front wheel brake, forces the rear wheel brake fluid pressure control means to decrease the brake fluid pressure in the rear wheel brake. Hence, with the control device of the invention, the front wheels are prevented from tending to be locked.

While there has been described in connection with the preferred embodiment of this invention, it will be obvious to those skilled in the art that various changes and modifications may be made therein without departing from the invention, and it is aimed, therefore, to cover in the appended claims all such changes and modifications as fall within the true spirit and scope of the invention.

What is claimed is:

1. An anti-skid control device, comprising:

a master cylinder having a pressure chamber therein;

a main path which hydraulically connects a front wheel brake and a rear wheel brake to said pressure chamber in said master cylinder;

a first electromagnetic valve for selectively isolating only said front wheel brake from said pressure chamber;

a second electromagnetic valve for selectively isolating only said rear wheel brake from said pressure chamber;

a circulating path which bypasses said first electromagnetic valve to circulate a brake fluid in said front wheel brake to said main path between said pressure chamber and said first and second electromagnetic valves, and which bypasses said second electromagnetic valve to circulate a brake fluid in said rear wheel brake to said main path between said pressure chamber and said first and second electromagnetic valves;

a hydraulic pressure pump provided in said circulating path, for sending a brake fluid under pressure from said front and rear wheel brakes to said main path between said pressure chamber and said first and second electromagnetic valves;

a first orifice provided in said circulating path between said front wheel brake and said hydraulic pressure pump, for increasing and decreasing the brake fluid pressure in said front wheel brake in response to the activation and deactivation of said first electromagnetic valve with said master cylinder and said hydraulic pressure pump in operation;

a second orifice provided in said circulating path between said rear wheel brake and said hydraulic pressure pump, for increasing and decreasing the brake fluid pressure in said rear wheel brake in response to the activation and deactivation of said second electromagnetic valve with said master cylinder and said hydraulic pressure pump in operation;

front wheel brake fluid pressure control means for determining whether the brake fluid pressure in said front wheel brake should be increased or decreased according to a rotational condition of a front wheel which is braked by said front wheel brake, and for making said first electromagnetic valve and said hydraulic pressure pump driven to decrease or increase the brake fluid pressure in said front wheel brake according to a determination;

rear wheel brake fluid pressure control means for determining whether the brake fluid pressure in said rear wheel brake should be increased or decreased according to a rotational condition of a rear wheel which is braked by said rear wheel brake, and for making said second electromagnetic valve and said hydraulic pressure pump driven to decrease or increase the brake fluid pressure in said rear wheel brake according to a determination; and forcible pressure decreasing means for substantially immediately forcing said rear wheel brake fluid pressure control means to decrease the brake fluid pressure in said rear wheel brake when said front wheel brake fluid pressure control means decreases the brake fluid pressure in said front wheel brake.

2. An anti-skid control device as claimed in claim 1, further comprising forcible pressure decrease releasing means for suspending the forcible decreasing of the brake fluid pressure in said rear wheel brake when the brake fluid pressure in said rear wheel brake is forcibly decreased by said forcible pressure decreasing means longer than a predetermined period of time.

3. An anti-skid control device as claimed in claim 1, further comprising:

means for sensing rotating speeds of the front and rear wheels, respectively;

means for calculating wheel accelerations of the front and rear wheels on the basis of the wheel speeds sensed by said sensing means; and means for estimating a vehicle body speed;

wherein the wheel speeds sensed by said sensing means, wheel accelerations by said calculating means, the vehicle body speed estimated by said estimating means are used as the rotational conditions of the front and rear wheels.

4. An anti-skid control device as claimed in claim 1, wherein said first and second electromagnetic valves are of the normally open type.

5. An anti-skid control device, comprising:

a master cylinder having a pressure chamber therein;

a main path which hydraulically connects a front wheel brake and a rear wheel brake to said pressure chamber in said master cylinder;

a first electromagnetic valve for selectively isolating only said front wheel brake from said pressure chamber;

a second electromagnetic valve for selectively isolating only said rear wheel brake from said pressure chamber;

a circulating path which bypasses said first electromagnetic valve to circulate a brake fluid in said front wheel brake to said main path between said pressure chamber and said first and second electromagnetic valves, and which bypasses said second electromagnetic valve to circulate a brake fluid in said rear wheel brake to said main path between said pressure chamber and said first and second electromagnetic valves;

a hydraulic pressure pump provided in said circulating path, for sending a brake fluid under pressure from said front and rear wheel brakes to said main path between said pressure chamber and said first and second electromagnetic valves;

a first orifice provided in said circulating path between said front wheel brake and said hydraulic pressure pump, for increasing and decreasing the brake fluid pressure in said front wheel brake in response to the activation and deactivation of said first electromagnetic valve with said master cylinder and said hydraulic pressure pump in operation;

a second orifice provided in said circulating path between said rear wheel brake and said hydraulic pressure pump, for increasing and decreasing the brake fluid pressure in said rear wheel brake in response to the activation and deactivation of said second electromagnetic valve with said master cylinder and said hydraulic pressure pump in operation;

front wheel brake fluid pressure control means for determining whether the brake fluid pressure in said front wheel brake should be increased or decreased according to a rotational condition of a front wheel which is braked by said front wheel brake, and for making said first electromagnetic valve and said hydraulic pressure pump driven to decrease or increase the brake fluid pressure in said front wheel brake according to a determination;

rear wheel brake fluid pressure control means for determining whether the brake fluid pressure in said rear wheel brake should be increased or decreased according to a rotational condition of a rear wheel which is braked by said rear wheel brake, and for making said second electromagnetic valve and said hydraulic pressure pump driven to decrease or increase the brake fluid pressure in said rear wheel brake according to a determination; and forcible pressure decreasing means for forcing said rear wheel brake fluid pressure control means to decrease the brake fluid pressure in said rear wheel brake whenever said front wheel brake fluid pressure control means decreases the brake fluid pressure in said front wheel brake.

6. An anti-skid control device as claimed in claim 5, further comprising forcible pressure decrease releasing means for suspending the forcible decreasing of the brake fluid pressure in said rear wheel brake when the brake fluid pressure in said rear wheel brake is forcibly decreased by said forcible pressure decreasing means longer than a predetermined period of time.

7. An anti-skid control device as claimed in claim 5, further comprising:

means for sensing rotating speeds of the front and rear wheels, respectively;

means for calculating wheel accelerations of the front and rear wheels on the basis of the wheel speeds sensed by said sensing means; and means for estimating a vehicle body speed;

wherein the wheel speeds sensed by said sensing means, the wheel accelerations by said calculating means, and the vehicle body speed estimated by said estimating means are used as the rotational conditions of the front and rear wheels.

8. An anti-skid control device as claimed in claim 5, wherein said first and second electromagnetic valves are of the normally open type.

* * * * *